No. 659,271. Patented Oct. 9, 1900.
F. WENDLER.
HOOK.
(Application filed Aug. 30, 1900.)

(No Model.)

WITNESSES:
Otto Munk
Isabella Waldron.

INVENTOR
Fritz Wendler
BY Richards & Co
ATTORNEYS

UNITED STATES PATENT OFFICE.

FRITZ WENDLER, OF GLATZ, GERMANY.

HOOK.

SPECIFICATION forming part of Letters Patent No. 659,271, dated October 9, 1900.

Application filed August 30, 1900. Serial No. 28,549. (No model.)

*To all whom it may concern:*

Be it known that I, FRITZ WENDLER, manufacturer, of Glatz, in the Province of Silesia, Germany, have invented some new and useful Improvements in Hooks; and I declare that the following is a full and clear description of the same.

The hook is represented in the accompanying drawings.

Figure 1:
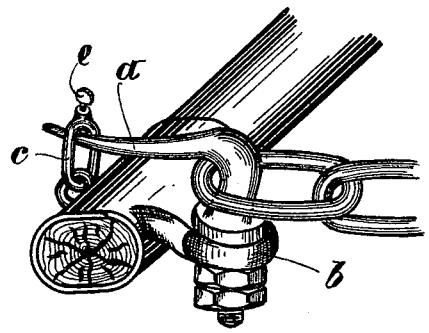
Figure 2:
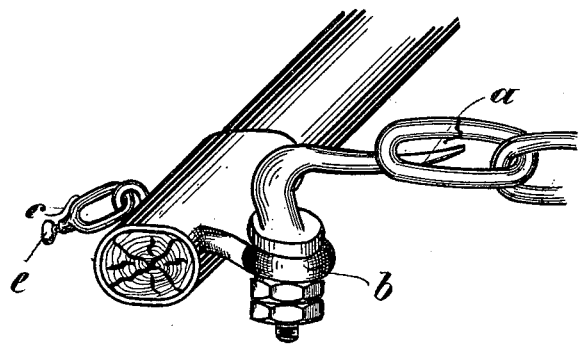

Figure 1 shows the hook shut, and Fig. 2 opened.

The hook $a$ is horizontally turnable in the eye $b$, fastened at the carriage or the like. If being shut, (see Fig. 1,) a ring $c$ can be stripped over the hook $a$, the end of which is directed backward in this case. This ring $c$ prevents the hook $a$ from turning. If the rope, chain, or the like should be hinged into the hook $a$, the ring $c$ is to be turned forward, Fig. 2. Then the ring of the chain can be easily stripped on the hook $a$. The latter can be turned into its former position and be fixed by means of the ring $c$, which is provided with a screw $d$.

I claim—

As a new article of manufacture a hook with a part $a$ bent at a right angle and turnably fastened at an eye $b$ combined with a ring $c$ provided with a screw $d$ in the described manner and for the purpose mentioned.

In witness whereof I have hereunto set my hand in presence of two witnesses.

FRITZ WENDLER.

Witnesses:
WILHELM WEIDNER,
HERMANN BARTSCH.